United States Patent [19]

Denzinger et al.

[11] Patent Number: 5,425,784
[45] Date of Patent: Jun. 20, 1995

[54] POLYMERIC TANNING AGENTS

[75] Inventors: Walter Denzinger, Speyer; Heinrich Hartmann, Limburgerhof; Brigitte Wegner, Roemerberg, all of Germany

[73] Assignee: BASF Aktiengesellschaft, Ludwigshafen, Germany

[21] Appl. No.: 256,054
[22] PCT Filed: Jan. 14, 1993
[86] PCT No.: PCT/EP93/00061
   § 371 Date: Jun. 27, 1994
   § 102(e) Date: Jun. 27, 1994
[87] PCT Pub. No.: WO93/14227
   PCT Pub. Date: Jul. 22, 1993

[30] Foreign Application Priority Data

Jan. 21, 1992 [DE] Germany ............... 42 01 452.2

[51] Int. Cl.$^6$ .................................. C14C 3/22
[52] U.S. Cl. ....................... 8/94.33; 8/94.21; 8/94.22; 8/94.18; 252/8.57
[58] Field of Search ............. 8/94.33, 94.21, 94.22, 8/94.18; 252/8.57; 427/389

[56] References Cited

U.S. PATENT DOCUMENTS 5,227,446 7/1993 Denzinger et al. ............. 527/314

Primary Examiner—Prince Willis, Jr.
Assistant Examiner—Alan D. Diamond
Attorney, Agent, or Firm—Oblon, Spivak, McClelland, Maier & Neustadt

[57] ABSTRACT

Water-soluble graft polymers of monosaccharides, oligosaccharides, polysaccharides and derivatives thereof, obtainable by free radical polymerization of A) a monomer selected from, or a monomer mixture of,
   (a) from 20 to 100% by weight of acrylic acid or methacrylic acid or of a mixture thereof or of the alkali metal, alkaline earth metal or ammonium salts thereof,
   (b) from 0 to 80% by weight of other monoethylenically unsaturated monomers which are copolymerizable with the monomers (a) and
   (c) from 0 to 5% by weight of monomers having at least 2 ethylenically unsaturated, nonconjugated double bonds in the molecule, in the presence of B) monosaccharides, oligosaccharides, polysaccharides, oxidatively, hydrolyrically or enzymatically degraded polysaccharides, oxidized hydrolyrically degraded or oxidized enzymatically degraded polysaccharides, chemically modified mono-, oligo- or polysaccharides or a mixture of the stated compounds in a weight ratio A:B of from 95:5 to 20:80, are used as a tanning agent for the self-tanning, pretanning and simultaneous tanning of pelts and skins and for the retanning of leather and skin.

13 Claims, No Drawings

POLYMERIC TANNING AGENTS

This application is a 371 of PCT/EP93/00061 filed Jan. 14, 1993.

The present invention relates to the use of water-soluble graft polymers which are obtainable by polymerizing acrylic acid or methacrylic acid, if required with further monomers, in the presence of monosaccharides, oligosaccharides, polysaccharides or derivatives thereof, as tanning agents in leather and skin production.

In leather production, the main tanning is usually carried out using mineral tanning agents, such as basic chromium, aluminum and/or zirconium salts alone or in combination with synthetic tanning agents. Subsequent retanning with natural or synthetic tanning agents serves to improve the leather properties, such as handle, softness, grain characteristics and body. For example, syntans, ie. water-soluble condensates of, for example, naphthalenesulfonic acid and formaldehyde or of phenolsulfonic acid, formaldehyde and urea, as well as ligninsulfonic acids and polymers and copolymers based on acrylic acid and other unsaturated polymerizable carboxylic acids, as a rule in combination with the above-mentioned syntans, are used as tanning agents for retanning.

For example, U.S. Pat. No. 2,205,882 (1) and U.S. Pat. No. 2,205,883 (2) describe the use of polyacrylic acid, of copolymers of acrylic and methacrylic acid, of styrene/maleic anhydride copolymers, of polymethacrylic acid, partially hydrolyzed polymethyl methacrylate and of copolymers of methacrylic acid with styrene or methyl methacrylate for tanning leather. The disadvantages of these products are that they generally considerably lighten the color and, when too large an amount is used, lead to a rubber-like handle of the leather.

For the production of leather and skins having a fine grain and uniform color, GB-A 2 074 173 (3) and GB-A 2 137 654 (4) describe terpolymers consisting of nitrogen-containing (meth)acrylates, (meth)acrylates and small amounts of (meth)acrylic acid as tanning agents. In order to reduce the tack, it may also be grafted onto water-soluble proteins or polysaccharides.

EP-A 441 197 (5) discloses graft copolymers of monosaccharides, oligosaccharides, polysaccharides and modified polysaccharides with monomer mixtures of monoethylenically unsaturated carboxylic acids or their anhydrides and, if appropriate, further ethylenically unsaturated monomers. These graft copolymers are recommended as additives for detergents.

Chem. Abstr. 94 (1981) (6), 192926s describes water-absorbing graft copolymers of polysaccharides and acrylic acid or acrylic acid derivatives.

Journal of the American Leather Chemists Association 85 (1990) (7), 425–430 recommends a novel acrylic acid syntan as a retanning agent for chrome leather. This syntan is prepared by graft polymerization of acrylic acid and methacrylic acid onto a mixture of sulfated fish oil and alginic acid.

The stated prior art agents have a number of disadvantages. In particular, they lighten the color of the leathers and skins thus produced to an excessive extent. Moreover, they lead to poor lightfastness and heat resistance. They may also impart an undesirable rubber-like handle to the leather.

It is an object of the present invention to provide the leather industry with tanning agents for leather and skin production which no longer have the stated disadvantages.

We have found that this object is achieved by the use of water-soluble graft polymers of monosaccharides, oligosaccharides, polysaccharides and derivatives thereof, obtainable by free radical polymerization of A) a monomer selected from or a monomer mixture of
  (a) from 20 to 100% by weight of acrylic acid or methacrylic acid or of a mixture thereof or of the alkali metal, alkaline earth metal or ammonium salts thereof,
  (b) from 0 to 80% by weight of other monoethylenically unsaturated monomers which are copolymerizable with the monomers (a) and
  (c) from 0 to 5% by weight of monomers having at least 2 ethylenically unsaturated, nonconjugated double bonds in the molecule, in the presence of B) monosaccharides, oligosaccharides, polysaccharides, oxidatively, hydrolyrically or enzymatically degraded polysaccharides, oxidized hydrolyrically degraded or oxidized enzymatically degraded polysaccharides, chemically modified mono-, oligo- or polysaccharides or mixtures of the stated compounds in a weight ratio A:B of from 95:5 to 20:80, as tanning agents for the self-tanning, pretanning and simultaneous tanning of pelts and skins and the retanning of leather and skin.

The water-soluble graft polymers are obtainable by homo- or copolymerization of the monomers A in the presence of the natural substances B.

Suitable monomers A of group (a) are (meth)acrylic acid and the alkali metal, alkaline earth metal or ammonium salts thereof. Mixtures of these may also be used. These salts are obtainable, for example, from (meth)acrylic acid if the acid in aqueous solution is neutralized with sodium hydroxide solution, potassium hydroxide solution, lithium hydroxide solution, magnesium hydroxide solution, ammonia, amines or alkanolamines. The monomers A of group (a) may be subjected to the graft copolymerization together with other monoethylenically unsaturated monomers (b) which are copolymerizable with the monomers (a). The amount of monomers (a) in the monomer mixture A is then from 20 to 100, preferably from 40 to 100, % by weight, while the monomers (b) may be present therein in an amount of up to 80, preferably up to 60, % by weight.

Examples of the monomers A of group (b) which are used in the graft polymerization include crotonic acid, maleic acid, maleic anhydride, fumaric acid, citraconic acid, citraconic anhydride, $C_1$–$C_8$-alkyl and hydroxyalkyl esters of acrylic acid, methacrylic acid or crotonic acid and mono- or di-$C_1$–$C_8$-alkyl or -hydroxyalkyl esters of maleic acid, fumaric acid or citraconic acid, eg. methyl acrylate, ethyl acrylate, n-butyl acrylate, methyl methacrylate, monomethyl maleate, dimethyl maleate, monoethyl maleate, diethyl maleate, $\beta$-hydroxyethyl acrylate, $\beta$- and $\gamma$-hydroxypropyl acrylate, $\delta$-hydroxybutyl acrylate, $\beta$-hydroxyethyl methacrylate and $\beta$- and $\gamma$-hydroxypropyl methacrylate.

Amides and N- substituted alkylamides of the compounds stated under (a) are also suitable as monomers A of group (b), for example acrylamide, methacrylamide, N-alkyl (meth)acrylamides where the alkyl group is of 1 to 18 carbon atoms, such as N-methylacrylamide, N,N- dimethylacrylamide, N-tert-butylacrylamide, N-octadecylacryl amide, dimethylaminopropylmethacrylamide and acrylamidoglycolic acid. Other suitable monomers (d) are alkylaminoalkyl (meth)acrylates, eg. β-(dimethylamino) ethyl methacrylate, β-(dimethylamino)ethyl acrylate, β-(diethylamino)ethyl acrylate, δ-(diethylamino)propyl acrylate and δ-(diethylamino)propyl methacrylate.

Other suitable monomers of group (b) are sulfo-containing monomers, for example vinylsulfonic acid, allylsulfonic acid, methallylsulfonic acid, styrene-sulfonic acids, 3-sulfopropyl acrylate, 3-sulfopropyl methacrylate and acrylamidopropanesulfonic acid, as well as monomers containing phosphonic acid groups, for example vinylphosphonic acid, allylphosphonic acid and acrylamidomethylpropanephosphonic acid.

This group (b) of monomers A also includes N-vinylpyrrolidone, N-vinylcaprolactam, N-vinylformamide, N-vinyl-N-methylformamide, 1-vinylimidazole, 1-vinyl-2-methylimidazole, vinyl acetate and vinyl propionate, acrylonitrile and methacrylonitrile, acrolein and methacrolein, crotonaldehyde and the acetals thereof.

Other suitable monomers A of group (b) are esters of alkoxylated $C_1$-$C_{18}$-alcohols, which have been reacted with from 2 to 50 mol of ethylene oxide, propylene oxide, butylene oxide or a mixture thereof, with the monoethylenically unsaturated carboxylic acids of group (a), for example the esters of acrylic acid or methacrylic acid with a $C_{13/15}$-alcohol which has been reacted with different amounts of ethylene oxide, for example 3, 5, 7, 10 or 30 mol of ethylene oxide.

Vinylaromatics, such as styrene and α-methyl-styrene, as well as $C_1$-$C_{12}$-olefins, eg. ethylene, propylene, 1-butene, 2-butene or butadiene, are also suitable as monomers A of group (b).

Other suitable monomers A of group (b) are N-mono- and N,N-disubstituted amides of monoethylenically unsaturated $C_3$-$C_8$-carboxylic acids, the amide nitrogen carrying, as substituents, polyoxyalkylated $C_2$-$C_{28}$-alkanols, in particular $C_2$-$C_{18}$-alkanols, which have been reacted with from 2 to 100, in particular from 3 to 20, mol of ethylene oxide, propylene oxide and/or butylene oxide. Examples of such compounds are
$H_2C=CH-CO-NH-CH_2CH_2-O(C_2H_4O)_n-H$,
$H_2C=CH-CO-N[CH_2CH_2-O-(C_2H_4O)_n-H]_2$,
$H_2C=C(CH_3)-CO-NH-(CH_2)_4-O-(C_2H_4O)_n-H$,
$H_2C=C(CH_3)-CO-NH-CH_2CH_2-O-(C_3H_6)_n-H$ and
$H_2C=CH-CO-NH-(CH_2)_{18}-O-(C_2H_4O)_n-H$ (n=3 to 20).

The basic monomers are preferably used in the form of the salts with mineral acids, eg. hydrochloric acid, sulfuric acid or nitric acid, or in quaternized form. Suitable quaternizing agents are, for example, dimethyl sulfate, diethyl sulfate, methyl chloride, ethyl chloride and benzyl chloride. The carboxylic acids are used in the form of the free acids and as alkali metal, alkaline earth metal or ammonium salts or as mixtures thereof.

Components (b) of monomer mixture A which are preferably used for the preparation of the graft polymers are crotonic acid, maleic acid, maleic anhydride, fumaric acid, itaconic acid, citraconic anhydride, $C_1$-$C_8$-alkyl, in particular $C_1$-$C_4$-alkyl, or hydroxyalkyl esters of acrylic acid or methacrylic acid or crotonic acid, mono- or di-$C_1$-$C_8$-alkyl, in particular $C_1$-$C_4$-alkyl or -hydroxyalkyl esters of maleic acid, fumaric acid or citraconic acid, acrylamide, methacrylamide, methacrolein, acrylamidomethylpropanesulfonic acid, N-vinylimidazole or a mixture thereof.

The graft polymers may be further modified by carrying out the graft polymerization in the presence of monomers A of group (c). In this case, the monomer mixtures contain up to 5% by weight of a monomer having at least two ethylenically unsaturated, nonconjugated double bonds in the molecule. These compounds are usually used as crosslinking agents in copolymerizations. They may be added to the monomers of group (a) which are used for the copolymerization or to the monomer mixtures of (a) and (b). Where they are employed, the preferably used amount of monomers (c) is from 0.05 to 2% by weight. The concomitant use of the monomers A of group (c) during the copolymerization results in an increase in the K values of the copolymers.

Suitable compounds (c) are, for example, methylenebisacrylamide, esters of acrylic acid and methacrylic acid with polyhydric alcohols, eg. glycol diacrylate, glyceryl triacrylate, ethylene glycol dimethacrylate, glyceryl trimethacrylate and polyols, such as pentaerythritol and glucose, which are at least diesterified with acrylic acid or methacrylic acid. Other suitable crosslinking agents are divinylbenzene, divinyldioxane, pentaerythritol triallyl ether and pentaallylsucrose. Water-soluble monomers, in particular ethylene glycol diacrylate or glycol diacrylates of polyethylene glycols having a molecular weight of up to 3,000, or a mixture thereof, are preferably used from this group of compounds.

In a preferred embodiment, for the preparation of the graft polymers, methacrylic acid or the alklai metal, alkaline earth metal or ammonium salts thereof are used alone as monomer A, or a mixture of at least 80% by weight of methacrylic acid or the alkali metal, alkaline earth metal or ammonium salts thereof and the monomers (b) are used as monomer mixture A.

The polymerization of the monomers A is carried out in the presence of natural substances based on polysaccharides, oligosaccharides, monosaccharides and derivatives thereof. The natural substances are, for example, saccharides of vegetable or animal origin or products of the metabolism of microorganisms and degradation and modification products thereof which are already dispersible or soluble in water or alkalis or become dispersible or soluble during the polymerization of the monomers A, directly or in a form which is partially or completely neutralized with alkalis, ammonia or amines.

These are, for example, pectin, algin, chitin, chitosan, heparin, carrageenan, agar, gum arabic, tragacanth, karayagum, ghatti gum, carob bean meal, guar gum, tara gum, inulin, xanthan, dextran, nigeran and pentosans, such as xylan and araban, whose main components consist of D-glucuronic acid, D-galacturonic acid, methyl D-galacturonate, D-mannuronic acid, L-rhamnose, D-xylose, L-fucose, D-mannose, D-fructose and D-glucose, 2-amino-2-deoxy-D-glucose and 2-amino-2-deoxy-D-galactose and N-acetyl derivatives thereof.

From the economic point of view, starch, thermally and/or mechanically treated starch, oxidatively, hydrolyrically or enzymatically degraded starches and chemically modified starches and chemically modified monosaccharides and oligosaccharides are preferably used as polysaccharides of component B in the graft polymerization. In particular, all starch is suitable. However, starches obtained from corn, wheat, rice and tapioca and in particular potato starches are preferred. The starches are virtually water-insoluble and can be converted into a water-soluble form in a known manner by thermal and/or mechanical treatment or by enzymatic or acid-catalyzed degradation. Other suitable components B are oxidatively degraded starches. Examples of starch degradation products which are obtainable by oxidative, hydrolyric or enzymatic degradation of starch are the following compounds: dextrins, such as white and yellow dextrins, maltodextrins, glucose syrups, maltose syrups, hydrolysis products having a high content of D-glucose, starch saccharification products and maltose and D-glucose and its isomerization product fructose. Other suitable components B are of course mono- and oligosaccharides, such as galactose, mannose, ribose, sucrose, raffinose, lactose and trehalose, as well as degradation products of cellulose, for example cellobiose and oligomers thereof.

Other suitable components B are oxidized starches, for example dialdehyde starch, and oxidized starch degradation products, such as gluconic acid, glucaric acid and glucuronic acid. Such compounds are obtained, for example, by oxidation of starch with periodate, chromic acid, hydrogen peroxide, nitrogen dioxide, nitrogen tetroxide, nitric acid or hypochlorite.

Further suitable components B are chemically modified polysaccharides, in particular chemically modified starches, for example starches and starch degradation products which have been converted into esters with acids and into ethers with alcohols. The esterification of these substances is possible both with inorganic and with organic acids or their anhydrides or chlorides. In direct esterification, the liberated water leads to acid-catalyzed cleavage of glycosidic bonds. Of particular industrial interest are phosphated and acetylated starches and starch degradation products. The comonest method for etherifying starch is to treat the starch or the starch degradation products with organic halogen compounds, epoxides or sulfates in aqueous alkaline solution. Starch ethers are, for example, the alkyl ethers, hydroxyalkyl ethers, carboxyalkyl ethers and allyl ethers of starch. Chemically modified starches of component B are understood as including cationically modified starches, for example starches reacted with 2,3-epoxypropyltrimethylammonium chloride, as described in U.S. Pat. No. 3,649,616.

Chemically modified polysaccharides include, for example, carboxymethylcellulose, hydroxyethylcellulose, hydroxypropylcellulose, carboxymethylhydroxyethylcellulose, sulfoethylcellulose, carboxymethylsulfoethylcellulose, hydroxypropylsulfoethylcellulose, hydroxyethylsulfoethylcellulose, methylsulfoethylcellulose and ethylsulfoethylcellulose.

Other suitable components B are chemically modified degraded starches, for example hydrogenated products of starch hydrolysis products, such as sorbitol and mannitol, maltitol and hydrogenated glucose syrups or oxidized hydrolytically degraded or enzymatically degraded starches.

The products of the acid-catalyzed or enzymatic transglycosidation or glycosidation, for example methylglucoside, are also suitable.

Particularly preferred components B are hydrolyrically degraded starches having a high content of monosaccharides and pure monosaccharides.

For the preparation of the graft polymers, the monomers A are advantageously subjected to free radical polymerization in the presence of compounds of the saccharide component B. In some cases, it may be advantageous for the action of the resulting graft polymer to use two or more of the compounds stated under B, for example mixtures of starches degraded under acid catalysis or enzymatically and gluconic acid, mixtures of a monosaccharide and an oligosaccharide, mixtures of an enzymatically degraded starch and a monosaccharide or mixtures of glucose and sucrose or mannose.

The polymerization can be carried out in the presence or absence of inert solvents or inert diluents. Since the polymerization in the absence of inert solvents or diluents leads in some cases to nonuniform graft polymers, graft polymerization in an inert solvent or diluent is preferred. For example, those inert diluents in which the compounds stated under B can be suspended and which dissolve the monomers A are suitable. In these cases, the graft polymers are present in suspended form after the polymerization and can readily be isolated in solid form by filtration.

Suitable inert diluents are, for example, toluene, o-, m- and p-xylene and isomer mixtures thereof, ethylbenzene, aliphatic hydrocarbons or gasoline fractions which contain no polymerizable monomers. Chlorohydrocarbons, such as chloroform, carbon tetrachloride, hexachloroethane, dichloroethane and tetrachloroethane, are also suitable.

In the procedure described above, in which the component B is suspended in an inert diluent, anhydrous compounds of component B are preferably employed, and anhydrides of dicarboxylic acids are preferably used from group (b) of the monomers A. A preferred method for the preparation of the graft polymers is solution polymerization, the saccharin component B, the monomers A and the resulting graft copolymer being present at least in disperse form and in many cases in dissolved form. For example, inert solvents such as methanol, ethanol, isopropanol, n-propanol, n-butanol, sec-butanol, tetrahydrofuran, dioxane and mixtures thereof, are suitable for the solution polymerization.

The polymerizationmay be carried out continuously or batchwise. As stated above, components A and B may also be polymerized in the absence of inert diluents or solvents. Continuous polymerization at from 160° to 250° C. is particularly suitable for this purpose. If necessary, it is possible here to proceed in the absence of polymerization initiators. However, catalysts which form free radicals under the polymerization conditions, for example inorganic and organic peroxides, persulfates, azo compounds and redox catalysts, are preferably used here too.

The water-soluble graft polymers described are generally prepared in the presence of free radical initiators. Preferred free radical initiators are all compounds which have a half life of less than 3 hours at the particular polymerization temperature chosen. If the polymerization is first initiated at a lower temperature and is completed at a higher temperature, it is advantageous to carry out the reaction with at least two initiators which decompose at different temperatures, ie. first to use an initiator which decomposes at a lower temperature for initiating the polymerization and then to complete the main polymerization using an initiator which decomposes at a higher temperature. Water-soluble and water-insoluble initiators or mixtures of water-soluble and water-insoluble initiators may be used. The water-insoluble initiators are then soluble in the organic phase.

For the temperature ranges stated below, the initiators mentioned there can be advantageously used: Temperature: 40° to 60° C.: Acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4- dimethylvaleronitrile), 2,2'azobis(2-methyl-N-phenylpropionamidine) dihydrochloride, 2,2'-azobis(2-methylpropionamidine) dihydrochloride; Temperature: 60° to 80° C.: tert-Butyl perpivalate, dioctanoyl peroxide, dilauroyl peroxide, 2,2'-azobis(2,4-dimethylvaleronitrile); Temperature: 80° to 100° C.: Dibenzoyl peroxide, tertbutyl per-2-ethylhexanoate, tert-butyl permaleate, 2,2'-azobisisobutyronitrile, dimethyl 2,2'-azobisisobutyrate, sodium persulfate, potassium persulfate, ammonium persulfate; Temperature: 100° to 120° C.: Bis(tert-butyl peroxy) cyclohexane, tert-butyl peroxyisopropyl carbonate, tert-butyl peracetate, hydrogen peroxide; Temperature: 120° to 140° C.: 2,2-Bis(tert-butylperoxy)butane, dicumyl peroxide, di-tert-amyl peroxide, di-tert-butyl peroxide; Temperature: >140° C.: p-Menthane hydroperoxide, pinane hydroperoxide, cumene hydroperoxide and tert-butyl hydroperoxide.

If, in addition to the stated initiators, salts or complexes of heavy metals, for example copper, cobalt, manganese, iron, vanadium, cerium, nickel and chromium salts, or organic compounds, such as benzoin, dimethylaniline or ascorbic acid, are also used, the half lives of the stated free radical initiators can be reduced. For example, tert-butyl hydroperoxide can be activated with the addition of 5 ppm of copper(II) acetylacetonate so that polymerization can be effected at as low as 100° C. The reducing component of redox catalysts may also be formed by, for example, compounds such as sodium sulfite, sodium bisulfite, sodium formaldehyde sulfoxylate and hydrazinc.

From 0.01 to 20, preferably from 0.05 to 15, % by weight, based on the monomers A used in the polymerization, of a polymerization initiator or of a mixture of a plurality of polymerization initiators are used. From 0.01 to 30% by weight of the reducing compounds are added as redox components. Heavy metals are used in an amount of from 0.1 to 100 ppm, preferably from 0.5 to 10 ppm. It is also advantageous to use a combination of peroxide, reducing agent and heavy metal as the redox catalyst.

The polymerization of the monomers A can also be carried out by the action of ultraviolet radiation, in the presence or absence of the UV initiators. For polymerization under the action of UV radiation, the conventional photoinitiators or sensitizers are used. These are, for example, compounds such as benzoin and benzoin ethers, α-methylbenzoin and α-phenylbenzoin. Triplet sensitizers, such as benzyl diketals, can also be used. The UV radiation sources in addition to high-energy UV lamps, such as carbon arc lamps, mercury vapor lamps or xenon lamps are, for example, low-UV light sources, such as fluorescent tubes having a high blue component.

To prepare polymers having a low K value, the graft polymerization is advantageously carried out in the presence of regulators. Examples of suitable regulators are mercapto compounds, such as mercaptoethanol, mercaptopropanol, mercaptobutanol, mercaptoacetic acid, mercaptopropionic acid, butyl mercaptan and dodecyl mercaptan. Other suitable regulators are allyl compounds, such as allyl alcohol, aldehydes, such as formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, from 0.05 to 20% by weight, based on the monomers A used in the polymerization, of said regulators are required.

In order to prepare colorless or only slightly colored graft polymers from components A and B, the polymerization is advantageously carried out in the presence of water-soluble phosphorus compounds in which the phosphorus has an oxidation state of from 1 to 4, the water-soluble alkali metal or ammonium salts thereof, water-soluble compounds containing $PO(OH)_2$ groups and/or water-soluble salts thereof. Phosphorous and hypophosphorous acid are preferably used. For reducing the discoloration of graft polymers, the suitable phosphorus compounds are used in amounts of from 0.01 to 5% by weight, based on the monomers A used. The suitable phosphorus compounds are described in EP-A 175 317.

Components A and B are usually polymerized in an inert gas atmosphere in the absence of atmospheric oxygen. In general, thorough mixing of the reactants is ensured during the polymerization. In the case of relatively small batches in which the heat of polymerization is reliably removed, the reactants, which are preferably present in an inert diluent, can be polymerized batchwise by heating the reaction mixture to the polymerization temperature. This temperature is from 40° to 180° C. In this method, however, graft polymers which are somewhat nonuniform and therefore do not reach their optimum efficiency are obtained.

In order better to be able to control the course of the polymerization reaction, after the initiation of the polymerization the monomers A are therefore added continuously or batchwise to the polymerizing mixture at a rate such that the graft polymerization can be readily controlled in the desired temperature range. A method of addition of monomers A in which component B or at least some of component B is initially taken in the polymerization reactor and is heated therein to the desired polymerization temperature while stirring is preferred. As soon as this temperature has been reached, the monomers A and the initiator and, if required, a regulator are added over a period of from about 1 to 10, preferably 2 to 8, hours. Such a procedure is used, for example, in the polymerization of components A and B in an inert diluent in which component B is suspended and also advantageously in the graft polymerization carried out in solution.

The graft polymers are preferably prepared by suspension or solution polymerization of the components A and B in an aqueous medium, solution polymerization in water being particularly preferred. In the solution polymerization in an aqueous medium, for example, component B in an aqueous medium is initially taken and is heated to the desired polymerization temperature and the monomers A are added continuously or batchwise to the polymerizing reaction mixture. The pH of the batch may be from 0.5 to 14. At a low pH, the (meth)acrylic acid (a) is used in the acid form and at a high pH in the salt form.

Polymers which have particularly little color and are especially efficient are obtained in the polymerization at a pH of from 4 to 8. This may be effected by a method in which the acid groups are brought to the desired pH before the polymerization, or the pH is kept constant during the polymerization by the continuous addition of neutralizing agents. Particularly suitable neutralizing agents are sodium hydroxide solution, potassium hydroxide solution, ammonia, ethanolamine, diethanolamine and triethanolamine. Water-soluble initiators or initiator systems are particularly preferred in the solution polymerization in water. In a particularly advantageous method of preparation, only water is initially taken in the reactor and components A, if necessary in a partly or completely neutralized form, and B are metered in batchwise or continuously at the desired polymerization temperature in the course of from 0.5 to 10 hours.

In the preparation of graft polymers which contain monoethylenicallyunsaturated dicarboxylic acids as component (b) of the monomers A, it is important, particularly for obtaining graft polymers having a low content of unpolymerized dicarboxylic acid, that the degree of neutralization of the monomers is controlled during the copolymerization. It should be from 20 to 80%, preferably from 30 to 70%, during the graft polymerization. For this purpose, for example, monomers A of groups (a) and (b) can be partially neutralized so that their degree of neutralization in each case is in the stated range. However, it is also possible for the monomeric dicarboxylic acids of group (b) which are initially taken in the reactor to be neutralized completely or to an extent of about 90% and the monomers of group (a) to be added in unneutralized form, so that the total degree of neutralization of the monomers (a) and (b) decreases during the polymerization from initially about 100% or about 90% to 20-80%. To maintain a certain degree of neutralization of the monomers (a) and (b), a base, for example sodium hydroxide solution, potassium hydroxide solution, ammonia or ethanolamine, may be added during the copolymerization. Depending on the composition of the graft polymers, the main amount, ie. from 60 to 80%, of the monomers (a) and (b) is polymerized at a degree of neutralization of from 20 to 80%.

As already stated, it is also possible to subject polysaccharides in aqueous suspension to the graft polymerization. Preferably, however, graft polymers are prepared from polysaccharides by first converting a water-insoluble polysaccharide in aqueous suspension with the addition of enzymes and/or acids into a water-soluble form and subjecting the resulting aqueous solution of the degraded polysaccharide to the graft polymerization. Here, a water-insoluble polysaccharide, for example potato starch, is first suspended in water and degraded. This degradation may be carried out under the action of enzymes, for example $\alpha$- or $\beta$-amylase, or of debranching enzymes, such as pullulanase, or by the action of inorganic or organic acids in a known manner. Examples of suitable inorganic acids are phosphoric acid, sulfuric acid, hydrochloric acid and nitric acid. Examples of suitable organic acids are saturated or unsaturated carboxylic acids, eg. formic acid, acetic acid, propionic acid, acrylic acid, methacrylic acid, maleic acid, iraconic acid, p-toluenesulfonic acid and benzenesulfonic acid.

The enzymatic degradation of starch is carried out at from 30° to 120° C., while the hydrolyric degradation of the starch is effected at from 50° to 150° C. From about 5 minutes to 10 hours are required for the hydrolytic degradation, the degree of hydrolyric degradation of the starch depending on the selected temperature, the pH and the time. Further information on the degradation of starch appears in the technical literature (cf. for example Günther Tegge, Stärke und Stärkederivate, Behr's Verlag, Hamburg 1984). In some cases, it has proven advantageous to use, in the enzymatic or hydrolytic degradation of the starch, at least one of the phosphorus compounds which, according to EP-A 175 317, lead to polymers which have only very little or no color.

In the graft polymerization, the temperatures are usually from 40° to 180° C., preferably from 60° to 150° C. As soon as the temperature in the polymerization is above the boiling points of the inert diluent or solvent or of the monomers A, the polymerization is carried out under pressure. The concentration of the components A and B in the polymerization in the presence of inert solvents or inert diluents is from 10 to 80, preferably from 20 to 70, % by weight.

The graft polymers can be prepared in the conventional polymerization apparatuses. For example, stirred kettles which are equipped with anchor, paddle or impeller stirrers or multistage impulse counter-current agitators are used for this purpose. Particularly in the graft polymerization in the absence of diluents, it may be advantageous to carry out the polymerization in a kneader. It may also be necessary to effect polymerization in a kneader if the procedure is carried out at high concentrations or if the natural substances have high molecular weights and initially swell considerably.

The components A and B are used in a weight ratio of from 95:5 to 20:80, preferably from 90:10 to 40:60.

Water-soluble graft polymers having Fikentscher K values of from 8 to 250 (measured in 1% strength by weight aqueous solutions of the polymers at pH 7 and 25° C.) are obtained, The preferred K values for the use according to the invention are from 10 to 100.

The graft polymers which can be prepared by the abovementioned processes are colorless to brownish products. In the case of polymerization in an aqueous medium, they are in the form of dispersions or polymer solutions. Depending on the particular composition or concentration of the graft polymers, the products are low-viscosity to pasty aqueous solutions or dispersions. Owing to the content of natural substances, the graft polymers described above are more readily biodegradable than the polymers used to date and based on ethylenically unsaturated monomers but can at least be eliminated from the wastewater of wastewater treatment plants with the sewage sludge.

The aqueous graft polymer solutions thus obtainable are very suitable as tanning agents for the production of leather and skins.

Thus, the graft polymers used according to the invention can be employed for the self-tanning and pretanning of pelts and skins in aqueous liquor. Graft polymers which are composed of methacrylic acid or salts thereof alone or of a monomer mixture A of methacrylic acid or salts (a) thereof and monomers (b) with at least 80% of (a) are particularly advantageously used for these applications.

In the self-tanning and pretanning of pelts and skins, advantageously the pickled pelts, for example cattle hides having a split thickness of from 1.5 to 4 mm, or skins, for example sheepskins, are treated, at a pH of from 2 to 7, in particular from 2.5 to 4.5, and at from 15° to 40° C., in particular from 20° to 35° C., in the course of from 3 to 20 hours, with an aqueous solution of the graft polymers used according to the invention. The treatment is carried out, for example, by drumming. The required amount of graft polymers used according to the invention is usually from 2 to 30, in particular from 5 to 25, % by weight, based on the pelt weight. The liquor ratio, ie. the percentage weight ratio of the treatment liquor to the goods, is usually from 30 to 200% in the case of pelts and from 100 to 2000% in the case of skins, based in each case on the pelt weight.

After the treatment is complete, the leather or skin is usually brought to a pH of from 2 to 8, in particular from 3 to 5, for example magnesium oxide, sodium carbonate, sodium bicarbonate or an organic acid, such as formic acid, or a salt thereof, being used for this purpose, and if necessary is treated with further tanning agents and, if desired, is dyed or fatliquored toward the end of the tanning process or thereafter.

Furthermore, the graft polymers used according to the invention can be employed for simultaneous tanning of pelts and skins, together with the tanning agents for the main tanning, which may be, for example, chrome tanning or aluminum tanning. In this case, the working conditions with regard to pH, temperature and duration of treatment are adjusted to the requirements of the main components of the tanning process, and the same applies to the treatment apparatus and the liquor ratio and to the aftertreatment. The required amount of graft polymers used according to the invention is usually from 0.1 to 20, in particular from 0.5 to 15, % by weight, based on the pelt weight.

Furthermore, the graft polymers used according to the invention can be employed for retanning tanned leather and skin, for example chrome leather, in an aqueous liquor. In the procedure usually adopted here, the pickled pelts and skins, for example cattle hides having split thicknesses of from 1.25 to 4mm, are tanned with, for example, a conventional chromium-containing tanning agent, such as a chromium(III) salt, eg. chromium(III) sulfate, in a conventional manner, and the resulting pretanned skins (wet blues in the case of chrome tanning) are neutralized and are treated at a pH of from 2 to 7, in particular from 2.5 to 6, and at from 15° to 60° C., in particular from 25° to 45° C., in the course of from 1 to 12 hours, with an aqueous solution of the graft polymers used according to the invention. This treatment is carried out, for example, by drumming. The required amount of graft polymers used according to the invention is usually from 2 to 30, in particular from 5 to 25, % by weight, based on the shaved weight of the leather. The liquor ratio is usually from 30 to 200% in the case of pelts and from 100 to 2000% in the case of skins, based in each case on the shaved weight of the leather.

After and, if necessary, also before the treatment, the leather or skin is usually brought to a pH of from 3 to 5, for example magnesium oxide or an organic acid, such as formic acid, or a salt thereof being used for this purpose, and, if desired, is dyed and fatliquored toward the end of the treatment or thereafter.

The leather or skin retanned in this manner may have been treated, before retanning with the graft polymers used according to the invention, additionally with other tanning agents, such as other polymer tanning agents or syntans. Furthermore, said graft polymers may be used simultaneously with such additional tanning agents, for example in the main tanning process.

Suitable additional or simultaneously used tanning agents are all conventional agents having a tanning effect on pelts and skins. A comprehensive treatment of such tanning agents is to be found, for example, in Ullmanns Encyklopädie der technischen Chemie, 3rd Edition, Volume 11, pages 585 to 612 (1960). Individual classes of tanning agents which may be mentioned are the mineral tanning agents, for example chromium, aluminum, titanium and zirconium salts, the synthetic tanning agents, such as the abovementioned polymer tanning agents and syntans, and the vegetable tanning agents.

The leathers and skins which in particular are pretanned with a chrome tanning agent and produced using the graft polymers used according to the invention have extremely high lightfastness and heat resistance and good body and softness and are tight-grained.

In addition, the graft polymers used according to the invention produce only slight lightening of the color, if any at all. Leathers and skins which have been produced with the graft polymers used according to the invention by self-tanning or, for example, by retanning of chrome leather are therefore very intensely and uniformly colored.

A particular advantage of the graft polymers used according to the invention is that, in contrast to conventional syntans, they can contain no unsulfonated phenols as residual monomers, which constitute a health hazard, and, in contrast to conventional polymer tanning agents, are more readily biodegradable owing to the incorporation of natural substances, ie. the saccharide components B, but at least can be better eliminated from the wastewater of wastewater treatment plants together with the sewage sludge.

EXAMPLES

Percentages are by weight, unless stated otherwise.

The K values of the polymers were determined according to H. Fikentscher, Cellulose-Chemie 13 (1932), 58–64 and 71–74, at 25° C. in 1% strength aqueous polymer solutions. Preparation of the graft polymers Example 1

In a heatable reactor which had been provided with a stirrer, a reflux condenser, a thermometer, feed apparatuses and nitrogen inlet and outlet apparatuses, 271 g of distilled water, 240 g of an 80% strength by weight aqueous solution of a starch degradation product consisting of about 17% of dextrose, 15% of maltose and 68% of maltotriose and higher sugars, 57.5 g of maleic anhydride, 0.7 g of phosphorous acid and 2.4 g of sodium disulfite were heated to 80° C. in a gentle stream of nitrogen, after which the batch was neutralized with 84.6 g of 50% strength sodium hydroxide solution. The mixture was then heated to about 100° C. until it boiled gently, and under boiling conditions, a solution of 160.3 g of acrylic acid in 170 g of distilled water was metered in uniformly in the course of 5 hours, and a solution of 13.7 g of 50% strength hydrogen peroxide in 76 g of distilled water was metered in uniformly in the course of 6 hours. Stirring was then continued for a further hour at 100° C., after which the pH of the batch was brought to 7 with 50% strength sodium hydroxide solution. The brownish, clear solution had a solids content of 38.7%. The K value of the polymer was 26.2.

Example 2

In a reactor according to Example 1, 100 g of distilled water were heated to 85° C. in a gentle stream of nitrogen, and a mixture of 200.4 g of acrylic acid and 484 g of distilled water was neutralized at about 20° C. with about 200 g of 50% strength sodium hydroxide solution and 21.6 g of N-vinylimidazole in the course of 2 hours, and a solution of 198 g of dextrose (crystals with 1 mol of water) in 200 g of distilled water and 65 g of 50% strength hydrogen peroxide were metered in uniformly in the course of 2.5 hours at from 85° to 95° C. The pH of the solution at the end of the reaction was 7.3. The pH was then brought to 8.5 by adding 70 g of a 50% strength sodium hydroxide solution. The solids content of the polymer solution formed was 31%. The K value of the polymer was 35.6.

Example 3

In a reactor according to Experiment 1, 100 g of distilled water were heated to 90° C. in a gentle stream of nitrogen and a solution of 298 g of methacrylic acid, 460 g of distilled water and 240 g of 50% strength sodium hydroxide solution (the preparation of this solution was carried out at 20° C. by slowly adding the sodium hydroxide solution to the aqueous methacrylic acid solution) and a mixture of 198 g of dextrose (crystals with 1 mol of water) in 200 g of distilled water and 68 g of 50% strength hydrogen peroxide were metered in uniformly in the course of 3 hours at from 90° to 10020 C. Stirring was then continued for 1 hour and the pH was brought to 9 with 74 g of 50% strength sodium hydroxide solution. The solids content of the yellowish polymer solution was 32.8% and the K value of the polymer was 27.0.

Example 4

The procedure was as in Example 3, except that, instead of 68 g of 50% strength hydrogen peroxide, only 34 g was used. The yellowish clear polymer solution had a solids content of 32.6% and the K value of the polymer was 34.8.

Example 5

The procedure was as in Example 2, except that, instead of acrylic acid, the same amount of methacrylic acid was used. The resulting clear, brownish polymer solution had a solids content of 29.5%. The K value of the polymer was 20.8.

Example 6

In a reactor according to Experiment 1, 200 g of distilled water were heated to the boil, and 258 g of methacrylic acid, a solution of 140 g of sodium hydroxide in 520 g of distilled water, a solution of 240 g of 75% strength royal glucose (glucose syrup with about 95% of dextrose, obtained by enzymatic degradation of starch) in 158 g of distilled water and 68 g of 50% strength hydrogen peroxide were metered in uniformly and synchronously at from 95° to 100° C. in the course of 2 hours. Thereafter, stirring was continued for a further hour. The resulting clear, virtually colorless solution had a solids content of 31.8%, and a pH of 7.8. The K value of the polymer was 31.1.

Example 7

In a reactor according to Experiment 1,543 g of distilled water and 30 g of potato starch were heated to the boil in a gentle stream of nitrogen, and 120 g of methacrolein were metered in uniformly in the course of 3 hours, 180 g of methacrylic acid uniformly in the course of 3.5 hours and a solution of 6.9 g of sodium persulfate in 150 g of distilled water uniformly in the course of 4 hours. Thereafter, stirring was continued for a further hour, after which 167 g of 50% strength sodium hydroxide solution were added to the viscous dispersion in the course of about 1 hour and stirring was continued at from 80° to 90° C. until the polymer had gone into solution. The brown, slightly turbid solution was viscous and had a solids content of 29.6% and a pH of 7.5. The K value of the polymer was 72.5. Use Examples

Example 8

(Self-tanning)

A pickled cattle hide having a split thickness of 3 mm, in 60% of water and 5% of sodium chloride, was brought to a pH of 4.5 with sodium formate and sodium bicarbonate at 20° C. Thereafter, 32% of polymer solution ($\triangleq$10% of active ingredient), prepared according to Experiment 6 were diluted in a ratio of 1:1 with water and added to the cattle hide. After a tanning time of 3 hours at 20° C., the pH of the liquor was brought to 4.5 again with formic acid. The hide was then treated with the tanning liquor for a further 15 hours and thereafter washed briefly. The shrinkage temperature of the resulting leather was 78° C. After fatliquoring with 8% of a commercial lightfast fatliquor and fixing with 0.4% of formic acid, the leather was dried and staked. In addition to good body and great whiteness, it had and [sic] excellent heat resistance and lightfastness.

Comparative Example A

The cattle hide was used for self-tanning, similarly to Example 8, with 10%, based on the solids content, of a commercial polymethacrylic acid. The resulting leather had a shrinkage temperature of 72° C. and, after fatliquoring and drying, exhibited substantially less whiteness.

Example 9

(Retanning of Chrome Leather to give Upholstery Leather)

A cattle wetblue having a shaved thickness of 1.2 mm was first washed with 300% of water at 30° C. and then, in 100% of liquor at 30° C., brought to a pH of 4.5 with sodium formate and sodium carbonate. After brief washing, the leather was retanned in 100% of liquor with 3%, based on the solid product, of the polymer prepared according to Example 1, at 40° C. in the drum. After drumming for 90 minutes, the leather was again washed and was dyed in 100% of liquor at 50° C. with 1% of a commercial metal complex leather dye, fatliquored with 8% of a commercial fatliquor and brought to a pH of 4.0 with formic acid. The leather was stored overnight on a frame and then stretched in the wet state and dried. After treating with sawdust, staking and milling, a soft leather having good body and an intense and very uniform color was obtained.

Example 9

(Retanning of Chrome Leather to give Upholstery Leather)

10%, based on the active ingredient, of each of the graft polymers from Experiments 2 to 7 were used, similarly to Example 9, for retanning chrome cattle leather. In all cases, soft leathers having good body and an attractive milled grain were obtained. Moreover, the leathers had a very uniform and intense color.

Comparative Example B (Retanning Chrome Leather to give Upholstery Leather)

A commercial polymer based on methacrylic acid was used for retanning similarly to Example 9. When the same amount of dye was used, the resulting leather was substantially lighter.

Example 16

(Retanning Chrome Leather to give Upper Leather)

A cattle wetblue having a shaved thickness of 1.5 mm was rinsed in a conventional manner, washed and then brought to a pH of 4.5 in 100% of liquor with sodium formate and sodium carbonate. Thereafter, retanning was carried out in 100% of fresh liquor with 5%, based on the solids content, of the graft polymer from Example 3 at 40° C. in the drum. After drumming for 90 minutes, the leather was again washed. Dyeing was effected in 100% of liquor at 50° C. with 1% of a commercial leather dye. Fatliquoring was then effected with a commercial fatliquor, and the pH was brought to 3.9 with formic acid. After brief rinsing, the leather was set out, dried and staked. A well dyed leather which had excellent body and a close smooth grain and was very suitable as upper leather was obtained.

Example 17

(Retanning Chrome Leather to give Upper Leather)

Retanning with the polymer prepared according to Example 5 was carried out similarly to Example 16. The leather obtained was slightly darker than in Example 16 and the cut was completely dyed. It likewise had a smooth grain, excellent body and a pleasant handle.

Comparative Example C (Retanning of Chrome Leather to give Upper Leather)

A commercial retanning agent based on polymethacrylic acid was used similarly to Examples 16 and 17. In comparison with Examples 16 and 17, the leather was substantially lighter and furthermore was not completely dyed in the cut.

We claim:

1. A process for the self-tanning, pretanning or simultaneous tanning of pelts and skins and for the retanning of leather and skin, comprising the step of:
   contacting pelts, skins or leather with an aqueous solution of a water-soluble graft polymer obtained by free radical polymerization of
   A) a monomer selected from the group consisting of:
      (a) from 20 to 100% by weight of acrylic acid, methacrylic acid, alkali metal salts thereof, alkaline earth metal salts thereof, ammonium salts thereof and mixtures thereof
      (b) from 0 to 80% by weight of other monoethylenically unsaturated monomers which are copolymerizable with monomers (a), and
      (c) from 0 to 5% by weight of additional monomers having at least two ethylenically unsaturated, nonconjugated double bonds,
   in the presence of
   B) a saccharide selected from the group consisting of monosaccharides, oligosaccharides, polysaccharides, oxidatively degraded polysaccharides, hydrolytically degraded polysaccharides, enzymatically degraded polysaccharides, oxidized hydrolytically degraded polysaccharides, oxidized enzymatically degraded polysaccharides, chemically modified monosaccharides, chemically modified oligosaccharides, chemically modified polysaccharides and mixtures thereof, wherein the weight ratio of A:B is from 95:5 to 20:80.

2. The process of claim 1, wherein said aqueous solution has a pH of 2–7.

3. The process of claim 2, wherein said aqueous solution has a pH of 2.5–6.

4. The process of claim 1, wherein said contacting step is conducted at a temperature from 15°–60° C.

5. The process of claim 4, wherein said contacting step is conducted at a temperature of 15°–40° C.

6. The process of claim 1, wherein said ratio A:B is from 90:10 to 40:60.

7. The process of claim 1, wherein said monoethylenically unsaturated monomers are selected from the group consisting of crotonic acid, maleic acid, maleic anhydride, fumaric acid, citraconic acid, citraconic anhydride, $C_1$–$C_8$-alkyl- and hydroxyalkyl esters of acrylic acid, methacrylic acid or crotonic acid, mono- and di-$C_1$–$C_8$-alkyl and -hydroxyalkyl esters of maleic acid, fumaric acid and citraconic acid, acrylamide, methacrylamide, methacrolein, acrylamido-methylpropanesulfonic acid, N-vinylimidazole and mixtures thereof.

8. The process of claim 1, wherein said additional monomers are selected from the group consisting of ethyleneglycol diacrylates and glycol diacrylates of polyethyleneglycols having a molecular weight up to 3,000 and mixtures thereof.

9. The process of claim 1, wherein monomer A is selected from the group consisting of methacrylic acid, alkali metal salts thereof, alkaline earth metal salts thereof, ammonium salts thereof and mixtures thereof.

10. The process of claim 1, wherein monomer A is a mixture of monomers (a) and monomers (b), and wherein said mixture comprises at least 80% by weight of methacrylic acid, alkali metal salts thereof, alkaline earth metal salts thereof, ammonium salts thereof or a mixture thereof.

11. The process of claim 1, wherein saccharide B is a hydrolytically degraded starch.

12. The process of claim 1, wherein saccharide B comprises monosaccharides, oligosaccharides or a mixture thereof.

13. The process of claim 12, wherein saccharide B is selected from the group consisting of galactose, mannose, ribose, sucrose, raffinose, lactose, trehalose, glucose, maltose and mixtures thereof.

* * * * *